(12) United States Patent
Wang et al.

(10) Patent No.: US 7,835,152 B2
(45) Date of Patent: Nov. 16, 2010

(54) HEAT DISSIPATING MODULE

(75) Inventors: Shaw-Fuu Wang, Taipei (TW);
Ting-Chiang Huang, Taipei (TW);
Sheng-Jie Syu, Taipei (TW);
Chiun-Peng Chen, Taipei (TW);
Chih-Kuang Chung, Taipei (TW);
Li-Ting Wang, Taipei (TW)

(73) Assignee: Inventec Corporation, Taipei (TW)

( * ) Notice: Subject to any disclaimer, the term of this patent is extended or adjusted under 35 U.S.C. 154(b) by 101 days.

(21) Appl. No.: 12/401,098

(22) Filed: Mar. 10, 2009

(65) Prior Publication Data

US 2010/0124026 A1 May 20, 2010

(30) Foreign Application Priority Data

Nov. 20, 2008 (CN) .................. 2008 1 0176692

(51) Int. Cl.
*H05K 7/20* (2006.01)
*F28D 5/00* (2006.01)

(52) U.S. Cl. .................... 361/710; 361/700; 361/709; 361/711; 361/702; 361/719; 361/679.52; 361/679.54; 165/80.2; 165/80.3

(58) Field of Classification Search ................ 361/700, 361/709–711, 702, 679.52, 679.54, 719; 165/80.2, 80.3
See application file for complete search history.

(56) References Cited

U.S. PATENT DOCUMENTS

| | | | | |
|---|---|---|---|---|
| 5,339,214 A * | 8/1994 | Nelson | ....................... | 361/695 |
| 5,398,748 A * | 3/1995 | Yamaji et al. | .............. | 165/80.2 |
| 5,549,155 A * | 8/1996 | Meyer et al. | .......... | 165/104.33 |
| 6,140,571 A * | 10/2000 | Kitahara et al. | ........... | 174/16.3 |
| 6,226,178 B1 * | 5/2001 | Broder et al. | ......... | 361/679.52 |
| 6,347,036 B1 * | 2/2002 | Yeager et al. | ......... | 361/679.46 |
| 6,373,700 B1 * | 4/2002 | Wang | ....................... | 361/698 |
| 6,469,894 B2 * | 10/2002 | Ubukata | ................... | 361/700 |
| 6,625,021 B1 * | 9/2003 | Lofland et al. | .............. | 361/697 |
| 6,650,540 B2 * | 11/2003 | Ishikawa | ................... | 361/695 |
| 6,781,835 B2 * | 8/2004 | Hashimoto et al. | ......... | 361/697 |
| 6,883,594 B2 * | 4/2005 | Sarraf et al. | ........... | 165/104.33 |
| 6,900,990 B2 * | 5/2005 | Tomioka | ................... | 361/752 |
| 6,966,363 B2 * | 11/2005 | Gailus et al. | ................ | 165/185 |
| 7,215,548 B1 * | 5/2007 | Wu et al. | .................... | 361/703 |
| 7,327,574 B2 * | 2/2008 | Frank et al. | ................. | 361/711 |
| 7,397,667 B2 * | 7/2008 | Lin et al. | .................... | 361/719 |
| 7,400,507 B2 * | 7/2008 | Wang et al. | ................. | 361/719 |

(Continued)

FOREIGN PATENT DOCUMENTS

GB    2293446 A  *  3/1996

(Continued)

*Primary Examiner*—Anatoly Vortman
(74) *Attorney, Agent, or Firm*—J.C. Patents

(57) ABSTRACT

A heat dissipating module includes a heat dissipating unit, a heat collecting plate with a position limiting hole, a heat conducting member connected between the heat dissipating element and the heat collecting plate, and a fixing structure. The fixing structure includes two end portions, an arcuate elastic portion, and a position limiting portion connected to the arcuate elastic portion and extending through the position limiting hole. Each end portion is slidably disposed on the heat collecting plate. The arcuate elastic portion is connected between the two end portions and adapted to be fastened to the heat collecting plate and a base, such that an electrical component is sandwiched in between the heat collecting plate and the base.

9 Claims, 4 Drawing Sheets

U.S. PATENT DOCUMENTS

| | | | |
|---|---|---|---|
| 7,405,933 B2 * | 7/2008 | Kobayashi et al. | 361/695 |
| 7,426,112 B2 * | 9/2008 | Chi-Wei et al. | 361/700 |
| 7,477,515 B2 * | 1/2009 | Tsai et al. | 361/700 |
| 7,489,510 B1 * | 2/2009 | Hung et al. | 361/700 |
| 7,508,669 B2 * | 3/2009 | Fonfara et al. | 361/699 |
| 7,515,418 B2 * | 4/2009 | Straznicky et al. | 361/702 |
| 7,542,293 B2 * | 6/2009 | Zhao et al. | 361/700 |
| 7,639,503 B2 * | 12/2009 | Tanaka | 361/719 |
| 7,701,708 B2 * | 4/2010 | Wu et al. | 361/679.47 |
| 2002/0126453 A1 * | 9/2002 | Ubukata | 361/720 |
| 2003/0024688 A1 * | 2/2003 | Dowdy et al. | 165/80.3 |
| 2003/0183373 A1 * | 10/2003 | Sarraf et al. | 165/104.33 |
| 2004/0037045 A1 * | 2/2004 | Phillips et al. | 361/719 |
| 2004/0042184 A1 * | 3/2004 | Tomioka | 361/752 |
| 2004/0109301 A1 * | 6/2004 | Shih-Tsung | 361/829 |
| 2004/0123978 A1 * | 7/2004 | Hashimoto et al. | 165/80.3 |
| 2004/0165350 A1 * | 8/2004 | Fan | 361/700 |
| 2004/0188080 A1 * | 9/2004 | Gailus et al. | 165/185 |
| 2004/0201958 A1 * | 10/2004 | Lev | 361/687 |
| 2004/0257770 A1 * | 12/2004 | Hu | 361/704 |
| 2005/0099776 A1 * | 5/2005 | Xue et al. | 361/700 |
| 2005/0141202 A1 * | 6/2005 | Lee et al. | 361/704 |
| 2005/0180110 A1 * | 8/2005 | I-Yung et al. | 361/700 |
| 2005/0259405 A1 * | 11/2005 | He | 361/729 |
| 2006/0181850 A1 * | 8/2006 | Frank et al. | 361/700 |
| 2006/0232934 A1 * | 10/2006 | Kusamoto et al. | 361/697 |

FOREIGN PATENT DOCUMENTS

JP  09191440 A * 7/1997

* cited by examiner

HEAT DISSIPATING MODULE

CROSS-REFERENCE TO RELATED APPLICATION

This application claims the priority benefit of China application serial no. 200810176692.X, filed Nov. 20, 2008. The entirety of the above-mentioned patent application is hereby incorporated by reference herein and made a part of specification.

BACKGROUND OF THE INVENTION

1. Field of the Invention

The present invention relates generally to a heat dissipating module, and more particularly, to a heat dissipating module that is adapted to cooperate with a base to sandwich an electronic component therebetween.

2. Description of Related Art

Following the rapid advancing of electronic technology, various electronic products have been widely utilized in our work and lives. Taking the notebook computer as an example, its interior electronic components, such as a central processing unit, generate a considerable amount of heat during operation. To ensure normal operation of the electronic components, a heat dissipating module is typically disposed in the notebook computer and used to enhance a heat dissipating efficiency of the computer system. The heat dissipating module includes a heat dissipating unit such as a heat dissipating fan. The heat dissipating unit may be connected to a heat dissipating plate which in turn is in contact with the electronic component. As such, the heat generated by the electronic component can be conducted to the heat dissipating unit.

In general, the heat collecting plate includes a spring plate disposed thereon. One end of the spring plate is fastened to the heat collecting plate, and the other end of the spring plate is fastened to the heat collecting plate and a base, such that the electronic component is sandwiched in between the heat collecting plate and the base. However, multidirectional and complicated forces are generated at each fastening area due to the structure being pulled, thus making the pressure applied to the electronic component non-uniform and difficult to calculate and hence affecting the process reliability and production yield.

SUMMARY OF THE INVENTION

Accordingly, the present invention is directed to a heat dissipating module which can provide good process reliability and production yield.

The present invention provides a heat dissipating module adapted to cooperate with a base to sandwich an electronic component. The heat dissipating module includes a heat dissipating unit, a heat collecting plate, a heat conducting member, and a fixing structure. The heat collecting plate has a position limiting hole. The heat conducting member is connected between the heat dissipating unit and the heat collecting plate. The fixing structure is disposed with respect to the heat collecting plate such that the heat collecting plate is disposed between the fixing structure and the base. The fixing structure includes two end portions, an arcuate elastic portion, and a position limiting portion. Each end portion is slidably disposed on the heat collecting plate. The arcuate elastic portion is connected between the two end portions and spaced a distance from the heat collecting plate, wherein the arcuate elastic portion is adapted to be fastened to the heat collecting plate and the base, such that the electronic component is sandwiched in between the heat collecting plate and the base. The position limiting portion is connected to the arcuate elastic portion and adapted to extend through the position limiting hole.

According to one embodiment of the present invention, the heat collecting plate further has two latches, each of the end portions has a latch hole, the latch holes are adapted to engagingly receive the corresponding latches respectively, and the width of each latch hole is larger than the width of a corresponding one of the latches.

According to one embodiment of the present invention, each of the end portions further has a protruding point adapted to contact with the heat collecting plate.

According to one embodiment of the present invention, the heat collecting plate further has two first positioning holes, and the protruding points are adapted to engage into the corresponding first positioning holes respectively.

According to one embodiment of the present invention, the arcuate elastic portion has a first fastening hole.

According to one embodiment of the present invention, the heat collecting plate has a second fastening hole corresponding to the first fastening hole.

According to one embodiment of the present invention, the heat dissipating module further includes a rigid structure mounted to the base such that the base is disposed between the rigid structure and the heat dissipating plate.

According to one embodiment of the present invention, the base has a second positioning hole, the rigid structure has an internally threaded post adapted to extend through the second positioning hole, and a screw extending through the first fastening hole and through the second fastening hole is adapted to thread into the internally threaded post to thereby fasten the fixing structure, the heat collecting plate, the base and the rigid structure together.

According to one embodiment of the present invention, the diameter of the second positioning hole is larger than or substantially equal to the outer diameter of the internally threaded post.

In view of the foregoing, in the heat dissipating module of the present invention, the two end portions of the fixing structure are slidably disposed on the heat collecting plate. When the arcuate elastic portion connected between the two end portions is fastened to the heat collecting plate, the two end portions slide with respect to the heat collecting plate in response to the elastic deformation of the arcuate elastic portion. As such, only a normal force is generated between each end portion and the heat collecting plate, thus making the pressure applied on the electronic component relatively uniform and easy to calculate.

In order to make the aforementioned and other features and advantages of the present invention more comprehensible, embodiments accompanied with figures are described in detail below.

DESCRIPTION OF THE EMBODIMENTS

Figure 1:
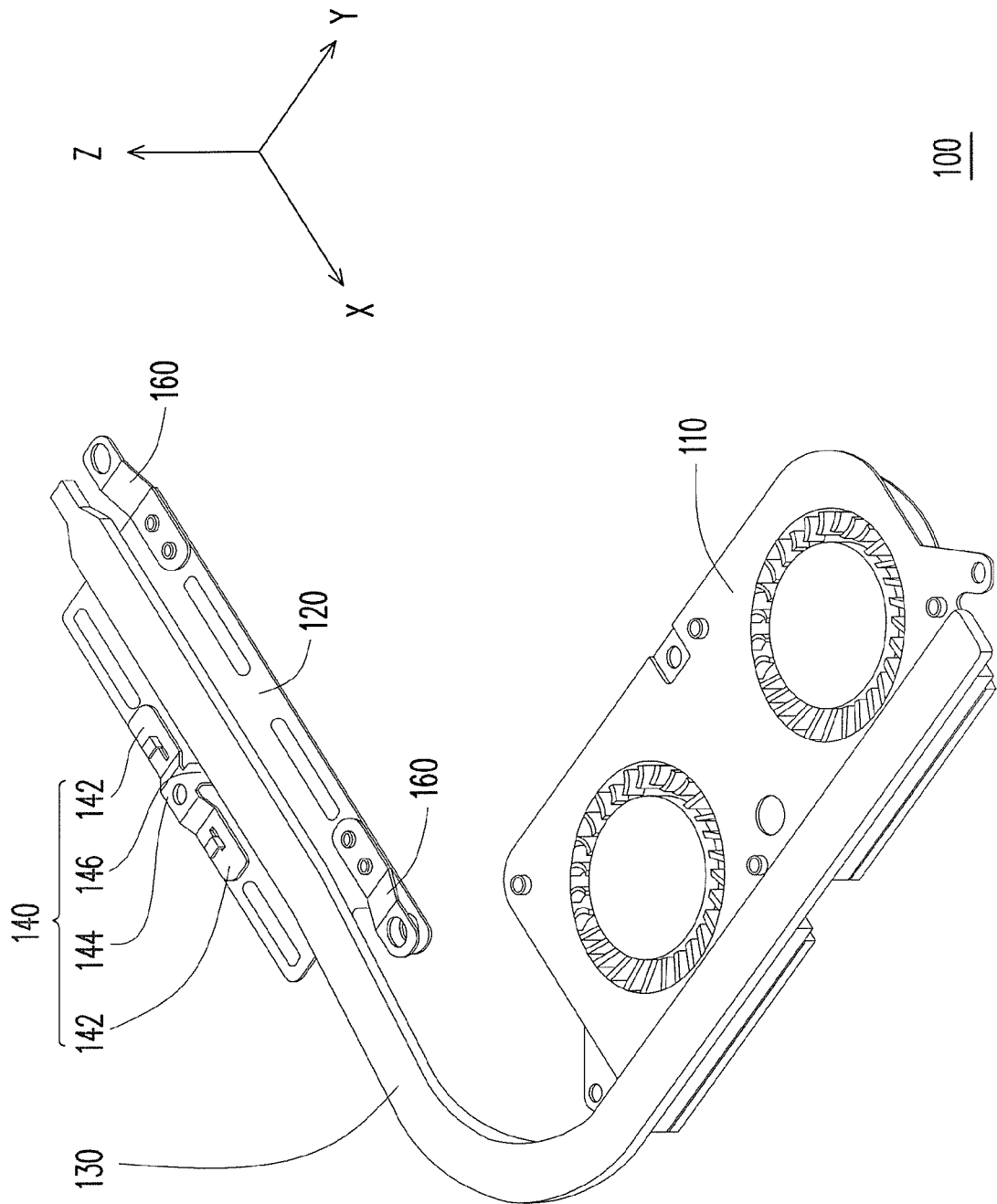
FIG. 1 is a perspective view of a heat dissipating module according to one embodiment of the present invention.
Figure 2:
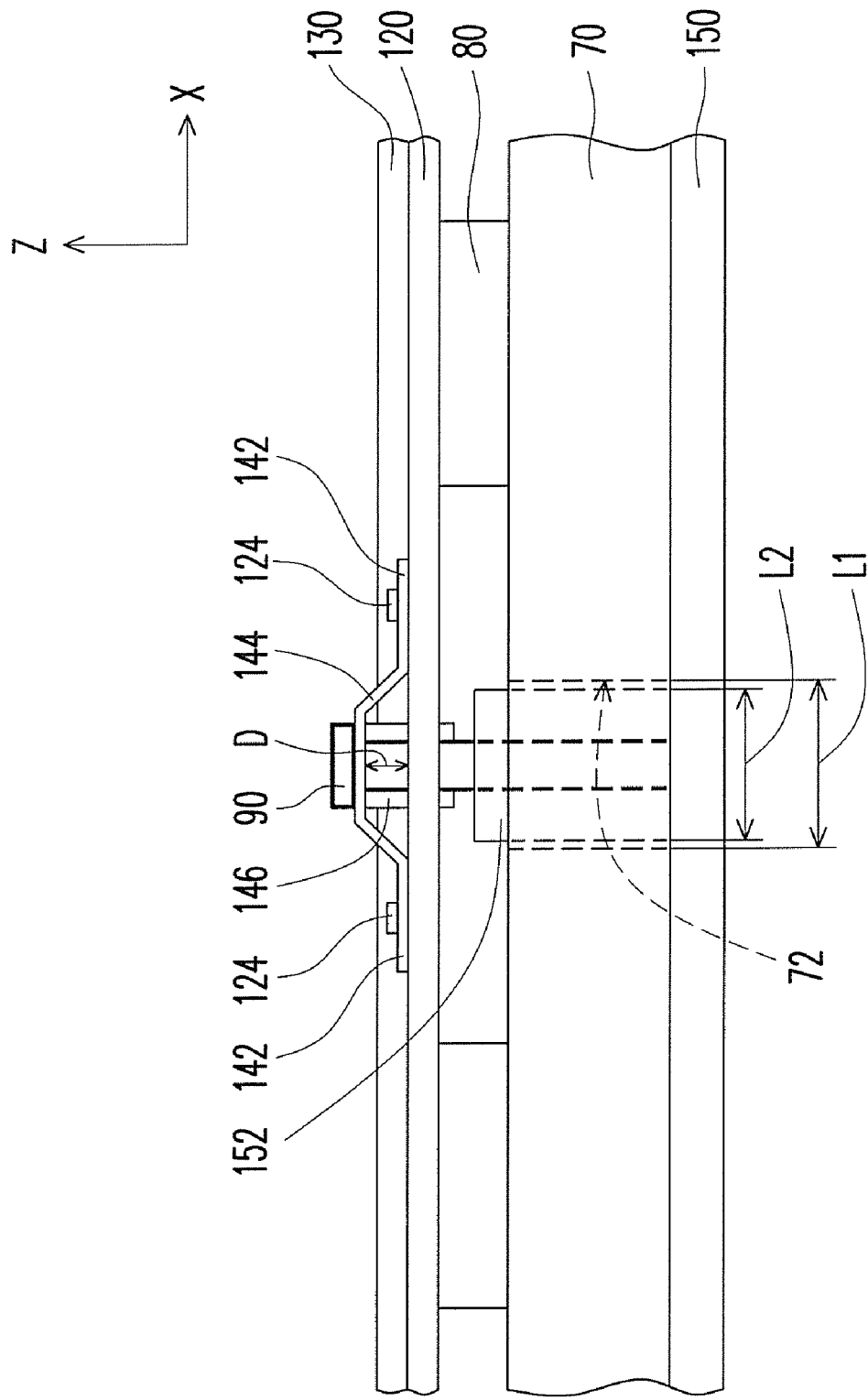
FIG. 2 is a partial side view of the heat dissipating module of FIG. 1.

FIG. 1 is a perspective view of a heat dissipating module according to one embodiment of the present invention. FIG. 2 is a partial side view of the heat dissipating module of FIG. 1. Referring to FIGS. 1 and 2, the heat dissipating module of the present embodiment is adapted to cooperate with a base 70 to sandwich at least one electronic component 80 (two electronic components are illustrated) therebetween. The heat dissipating module 100 includes a heat dissipating unit 110, a heat collecting plate 120 for collecting heat from the electronic components 80, a heat conducting member 130, and a fixing structure 140. The heat conducting member 130 is connected between the heat dissipating unit 110 and the heat collecting plate 120 for conducting the heat of the heat collecting plate 120 to the heat dissipating unit 110. The fixing structure 140 is disposed with respect to the heat collecting plate 120 such that the heat collect plate 120 is located between the fixing structure 140 and the base 70.

As shown in FIGS. 1 and 2, the fixing structure 140 includes two end portions 142, an arcuate elastic portion 144, and a position limiting portion 146. Each end portion 142 is slidably disposed on the heat collecting plate 120. The arcuate elastic portion 144 is connected between the two end portions 142 and spaced from the heat collecting plate 120 by a distance D. The arcuate elastic portion 144 is adapted to be fastened to the heat collecting plate 120 and the base 70, such that the electronic components 80 is sandwiched in between the heat collecting plate 120 and the base 70.

It should be noted that when the arcuate elastic portion 144 is fastened to the heat collecting plate 120 and the base 70, the distance D provides a space for elastic deformation of the arcuate elastic portion 144. In addition, each end portion 142 slides with respect to the heat collecting plate 120 in response to the elastic deformation of the arcuate elastic portion 144. In other words, a z-direction force is generated between each end portion 142 and the heat collecting plate 120 but no force is generated in x and y directions.

Figure 3:
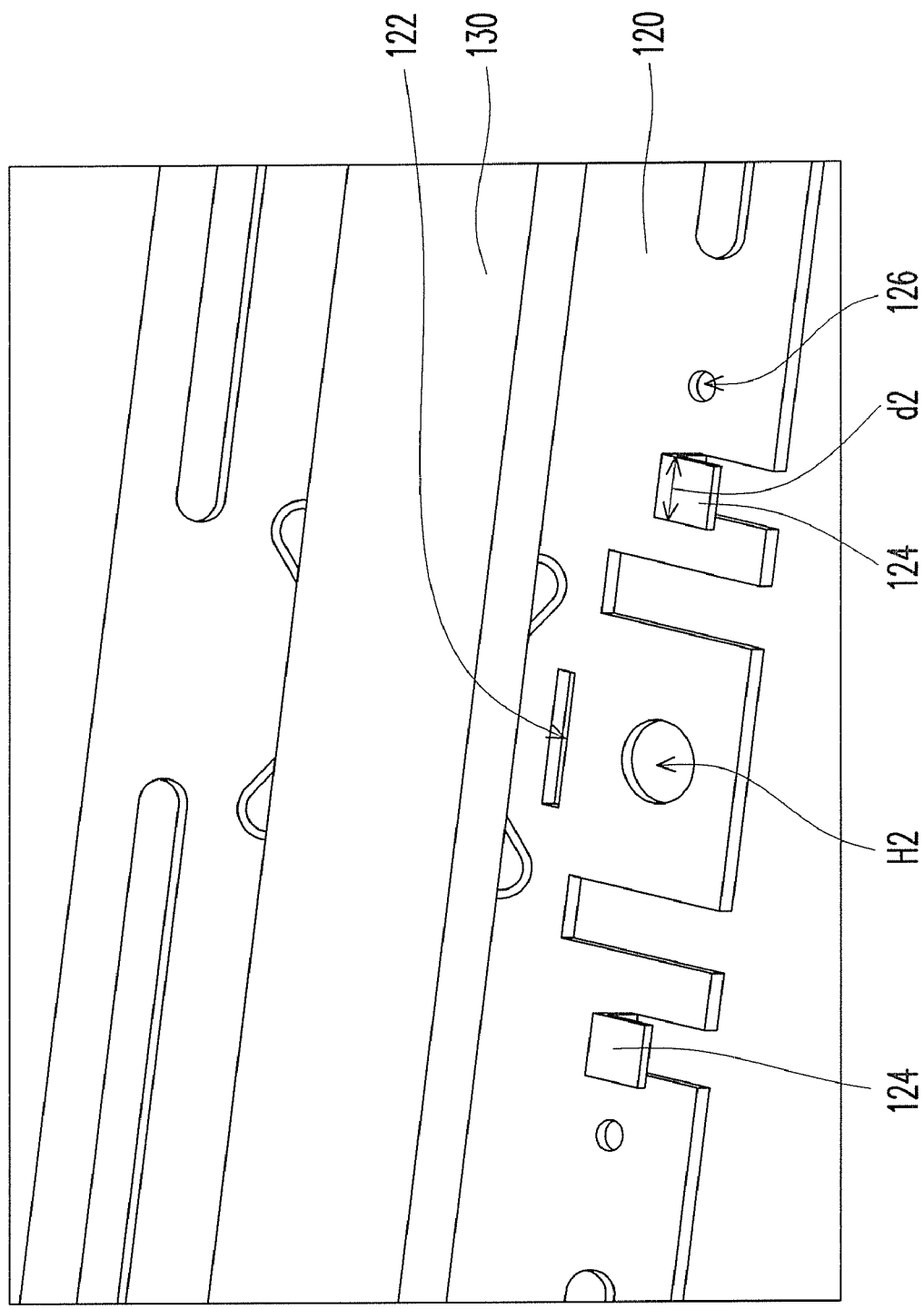
FIG. 3 is a partial perspective view of the heat dissipating module of FIG. 1.

FIG. 3 is a partial perspective view of the heat dissipating module of FIG. 1. Referring to FIG. 3, the heat collecting plate 120 has a position limiting hole 122. As shown in FIG. 1, the position limiting portion 146 is connected to the arcuate elastic portion 144 and is adapted to pass through the position limiting hole 122 (shown in FIG. 3) to thereby limit movement of the fixing structure 140 in x and y directions.

Figure 4:
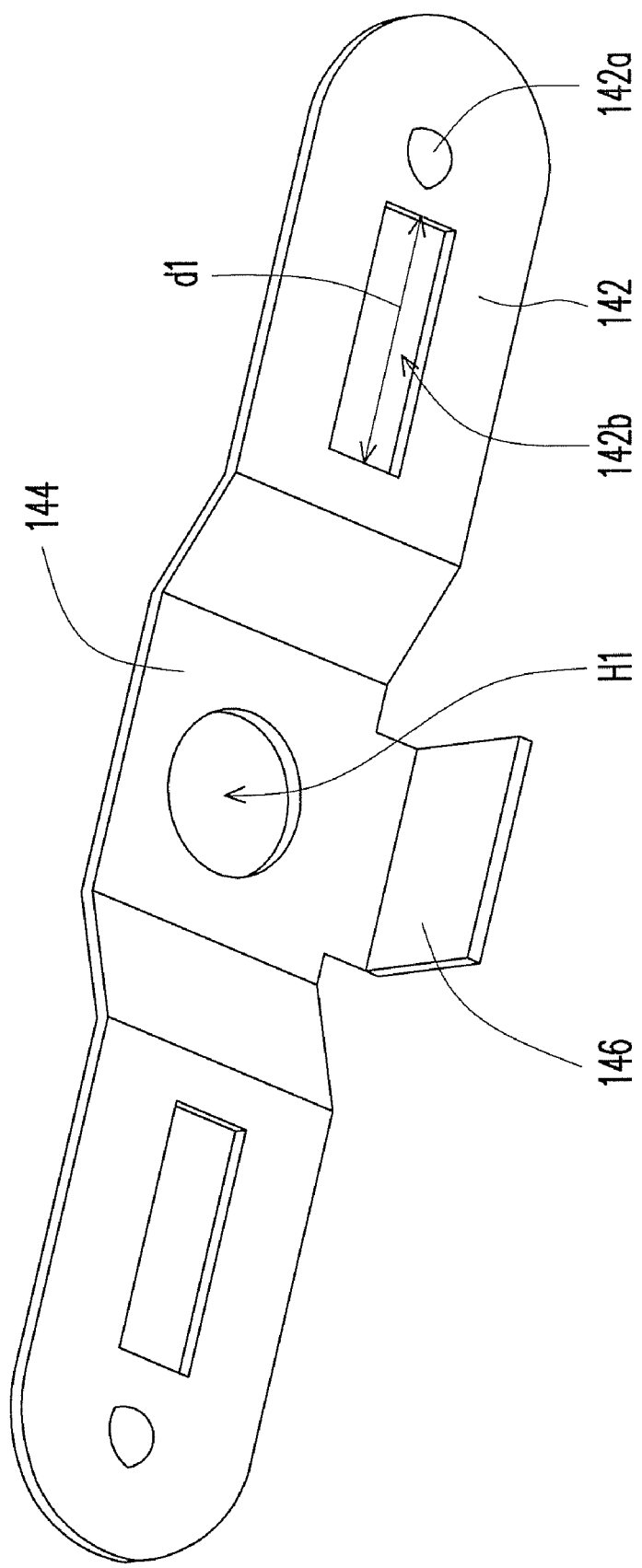
FIG. 4 is a perspective view of the fixing structure of FIG. 1.

FIG. 4 is a perspective view of the fixing structure of FIG. 1. Referring to FIG. 4, in the present embodiment, the arcuate elastic portion 144 has a first fastening hole H1. Referring to FIG. 3, the heat collecting plate 120 has a second fastening hole H2 corresponding to the first fastening hole H1. Referring to FIGS. 2, 3 and 4, both the arcuate elastic portion 144 and the heat collecting plate 120 can be fastened to the base 70 by means of a screw 90, the first fastening hole H1 and the second fastening hole H2.

In addition, referring to FIG. 4, each end portion 142 further has a protruding point 142a adapted to contact with the heat collecting plate 120 (shown in FIG. 1), for facilitating identifying a contact point between the end portion 142 and the heat collecting portion 120 and hence facilitating calculation of the force.

As shown in FIG. 3, in the present embodiment, the heat collecting plate 120 further has two first positioning holes 126. The two protruding points 142a are adapted to engage into the first positioning holes 126, respectively. It should be noted that the location of the first positioning holes 126 aligns with the location of the protrusions 142a after the end portions 142 slide with respect to the heat collecting plate 120 in response to the elastic deformation of the arcuate elastic portion 144 that is caused by fastening the arcuate elastic portion 144 to the heat collecting plate 120. By such positioning through the first positioning holes 126, the contact points between the protrusions 142a and the heat collecting plate 120 are made more confirmative, thereby facilitating calculation of the force and torque of the structure.

In an unillustrated alternative embodiment, two position limiting blocks respectively connected to the two end portions 142 and two corresponding limiting blocks connected to the heat collecting plate 120 can be used in lieu of the protruding points 142a and the first positioning holes 126 to achieve the same positioning result.

In addition, in another unillustrated alternative embodiment, the first positioning holes 126 may be slots and the protrusions 142a are adapted to slide within the slots to increase the freedom of sliding of each end portion 142 after the arcuate elastic portion 144 is fastened. The first position hole 126 of the present invention is not intended to be limited to any particular form and therefore can be varied based on actual requirements.

Referring to FIG. 1, in the present embodiment, each end portion 142 can be connected to the heat collecting plate 120 in a latching manner to make the end portion 142 slidable. Specifically, as shown in FIGS. 3 and 4, the heat collecting plate 120 has two latches 124 and each end portion 142 of the fixing structure 140 has a latch hole 142b. The two latch holes 142b are adapted to engagingly receive the two latches 124 respectively, and the width d1 of each latch hole 142b is larger than the width d2 of a corresponding latch 124 to thereby provide a space for each end portion 142 to slide with respect to the heat collecting plate 120.

Rather than coupling each end portion 142 to the heat collecting plate 120 in a latching manner as above, in another unillustrated embodiment, the end portion can be fastened with a screw with the screw being not fully tightened such that each end portion is slidable with respect to the heat collecting plate.

Referring to FIG. 2, in the present embodiment, the base 70 is, for example, a motherboard of a notebook computer and the heat dissipating module 100 may further include a rigid structure 150 with good rigidity. The rigid structure 150 is mounted to the base 70 such that the base 70 is positioned between the rigid structure 150 and the heat collecting plate 120 to increase a structural strength and avoid deformation of the base 70.

Specifically, the base 70 has a second positioning hole 72 and the rigid structure 150 has an internally threaded post 152. The internally threaded post 152 extends through the second positioning hole 72 to position the rigid structure 150 in a specific location relative to the base 70. A screw 90 extending through the first fastening hole H1 and through the second fastening hole H2 can be screwed into the internally threaded post 152 extending through the second positioning hole 72 to thereby fasten the fixing structure 140, the heat collecting plate 120, the base 70 and the rigid structure 150 together, with the electronic components 80 being sandwiched between the heat collecting plate 120 and the base 70. The diameter L1 of the second positioning hole 72 is larger than or substantially equal to the outer diameter L2 of the internally threaded post 152 such that the internally threaded post 152 can extend through the second positioning hole 72.

In addition, referring to FIGS. 1 and 2, in the present embodiment, the heat dissipating module 100 may further include a plurality of spring plates 160 disposed on the heat collecting plate 120. The spring plates 160 is adapted to be fastened to the heat collecting plate 120 and the base 70 such that the electronic components 80 can be more stably sandwiched. In the present embodiment, the electronic component 80 may be a central processing unit.

In view of the foregoing, in the heat dissipating module of the present invention, the two end portions of the fixing structure are slidably disposed on the heat collecting plate. When the arcuate elastic portion connected between the two end portions is fastened to the heat collecting plate, the two end portions slide with respect to the heat collecting plate in response to the elastic deformation of the arcuate elastic portion. Only a normal force is generated between each end portion and the heat collecting plate such that the pressure applied on the electronic component is relatively uniform and easy to calculate, thereby increasing the process reliability and production yield.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A heat dissipating module adapted to cooperate with a base, wherein, an electronic component is sandwiched in between the heat dissipating module and the base, the heat dissipating module comprising:
    a heat dissipating unit;
    a heat collecting plate, having a position limiting hole;
    a heat conducting member, connected between the heat dissipating unit and the heat collecting plate;
    a fixing structure, disposed with respect to the heat collecting plate such that the heat collecting plate is disposed between the fixing structure and the base, the fixing structure comprising:
        two end portions, each end portion slidably disposed on the heat collecting plate;
        an arcuate elastic portion, connected between the two end portions and spaced a distance from the heat collecting plate, wherein the arcuate elastic portion is adapted to be fastened to the heat collecting plate and the base, wherein the electronic component is sandwiched in between the heat collecting plate and the base; and
        a position limiting portion, connected to the arcuate elastic portion and adapted to extend through the position limiting hole.

2. The heat dissipating module according to claim 1, wherein the heat collecting plate further includes two latches, and each of the end portions has a latch hole, wherein the latch holes are adapted to engagingly receive the corresponding latches respectively, and the width of each latch hole is larger than the width of a corresponding one of the latches.

3. The heat dissipating module according to claim 1, wherein each of the end portions further includes a protruding point adapted to contact with the heat collecting plate.

4. The heat dissipating module according to claim 3, wherein the heat collecting plate further has two first positioning holes, and the protruding points are adapted to engage into the corresponding first positioning holes respectively.

5. The heat dissipating module according to claim 1, wherein the arcuate elastic portion has a first fastening hole.

6. The heat dissipating module according to claim 5, wherein the heat collecting plate has a second fastening hole corresponding to the first fastening hole.

7. The heat dissipating module according to claim 6, further comprising a rigid structure mounted to the base such that the base is disposed between the rigid structure and the heat dissipating plate.

8. The heat dissipating module according to claim 7, wherein the base has a second positioning hole, and the rigid structure has an internally threaded post, wherein the internally threaded post is adapted to extend through the second positioning hole, and a screw extending through the first fastening hole and through the second fastening hole is adapted to thread into the internally threaded post to thereby fasten the fixing structure, the heat collecting plate, the base and the rigid structure together.

9. The heat dissipating module according to claim 8, wherein the diameter of the second positioning hole is larger than or substantially equal to the outer diameter of the internally threaded post.

* * * * *